F. K. & E. F. ATKINS.
MACHINE FOR SEPARATING SOLIDS FROM LIQUIDS.
APPLICATION FILED JAN. 21, 1907.

901,056.

Patented Oct. 13, 1908.
5 SHEETS—SHEET 5.

UNITED STATES PATENT OFFICE.

FRANK K. ATKINS AND EARL F. ATKINS, OF DENVER, COLORADO; SAID EARL F. ATKINS ASSIGNOR TO SAID FRANK K. ATKINS.

MACHINE FOR SEPARATING SOLIDS FROM LIQUIDS.

No. 901,056.    Specification of Letters Patent.    Patented Oct. 13, 1908.

Application filed January 21, 1907. Serial No. 353,269.

*To all whom it may concern:*

Be it known that we, FRANK K. ATKINS and EARL F. ATKINS, both citizens of the United States, residing in the city and county of Denver and State of Colorado, have invented certain new and useful Improvements in Machines for Separating Solids from Liquids; and we do declare the following to be a full, clear, and exact description of the invention, such as will enable others skilled in the art to which it appertains to make and use the same, reference being had to the accompanying drawings, and to the figures of reference marked thereon, which form a part of this specification.

The invention relates to the separating of free gold from its ores by means of spreading gold bearing sand or crushed ore in a thin sheet over variably retarding curved sheeting surfaces, alternated with grooves containing liquid mercury, by means of centrifugal force, in such manner as to have scoured the gold on its upward passage to the mercury zone, thereby obtaining a higher per cent. of saving of the amorphous or unamalgamable (rusty) gold. Its further objects are to submerge and save the float gold, to free by attrition the fine particles of gold from the cement, sands and garnet; to avoid the loss of the mercury by flouring; to render the operation cheap, rapid and thorough in the separation of the gold from the sands, also to greatly facilitate making clean-ups with or without the use of water. It is effectual in saving the values in connection with water and also especially adapted for recovering the gold dry.

The machine without employing mercury may be put to other uses, among which are the following:

1. After precipitation to recover the gold sulfids from the liquid in chlorination, the sulfids being caught in the groove while the liquid is discharged at the rim, thereby dispensing with the filter press. This is a much more rapid and far less complex method of treatment than by filtering through the filter press, with less annoyance in making clean-ups and yields a cleaner saving of values.

2. The extraction of all foreign substances from water or the perfect extraction of solids from liquids where the specific gravities vary. Among its most valuable uses under this head are the extraction of the sand and slimes from the cyanid gold bearing solution in cyanidation; the pulp from the gold bearing solution in chlorination and the ground ores or pulp from the solution carrying copper values in lixiviation, dispensing in each case with the annoyance and delays from clogging in leaching by gravity under the methods heretofore in vogue.

3. To collect the slimes which pass off at the rear end of the tables in concentration, carrying float gold, lead, zinc, iron and copper sulfids also gray copper, together with their gold and silver accompaniment, all of which having particles of air in their curves and cells, either float upon the water or are held in suspension and washed away. The values so recovered are of course in the slime concentrates.

4. When lined with clay to recover in a concentrated form the precious metal values in the molten slag as drawn from the smelter furnace that have heretofore gone into the dump.

To illustrate the machine we refer to the accompanying drawings.

The same reference characters indicate the same parts in all the views.

Figures 1, 10, 11:
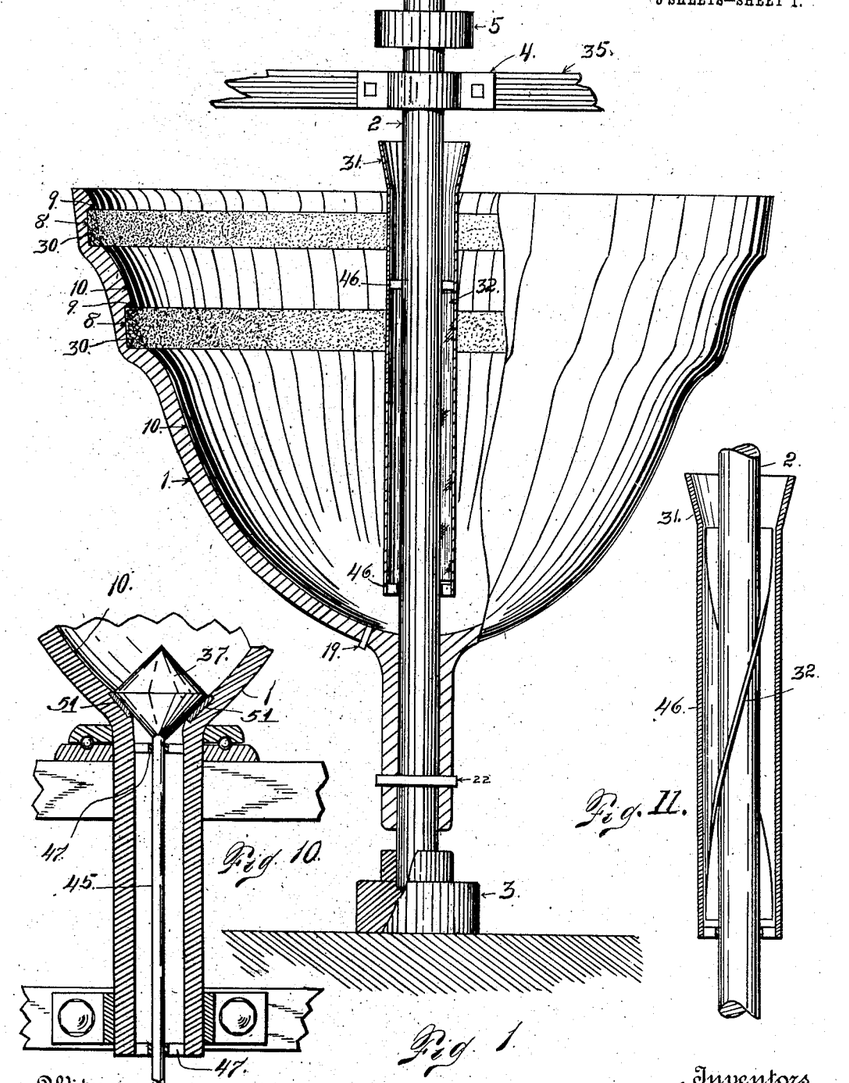
Figure 1 is an elevation partly in section embodying one form of our invention.
Fig. 10 is a sectional view showing a form of the construction in which the shaft is omitted.
Fig. 11 is a fragmentary view of the shaft provided with a modified form of feed tube.
Figure 2:
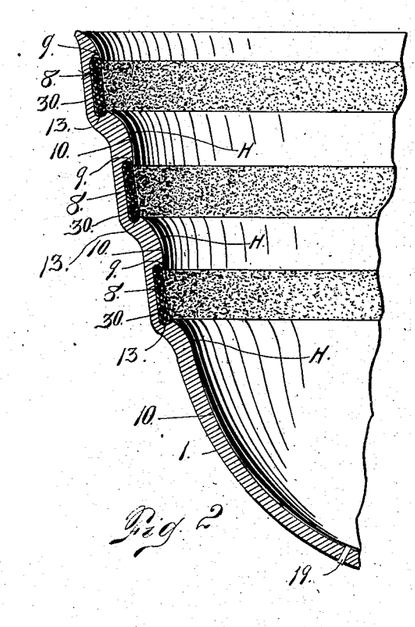
Fig. 2 is a section of a part of the bowl showing a modified form of construction.
Figure 5:
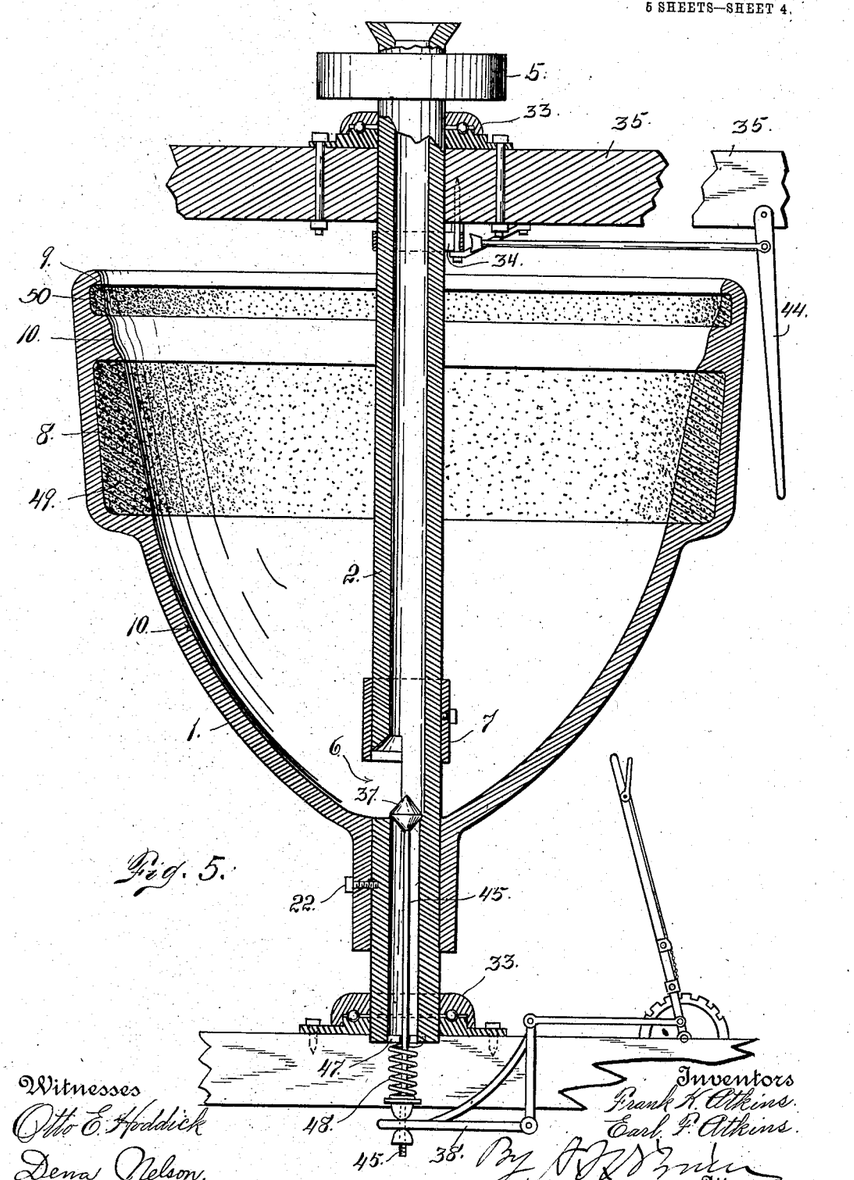
Fig. 5 is a sectional elevation of a centrifugal separator showing another form of construction including a bottom discharge.

The reference numeral 1 indicates the bowl of the machine shaped like an inverted bell; numeral 2 indicates the shaft. In Figs. 1 and 5 the shaft rests in step-box 3, and is supported by box 4 and operated by pulley 5. In Fig. 1 tube 31 surrounds the shaft, is attached thereto by webs 46 and used as a feeder; between this tube and the shaft are upright partitions 32 either vertical or spiral; these partitions aid in imparting the rotary movement to the ore.

Figures 4, 9:
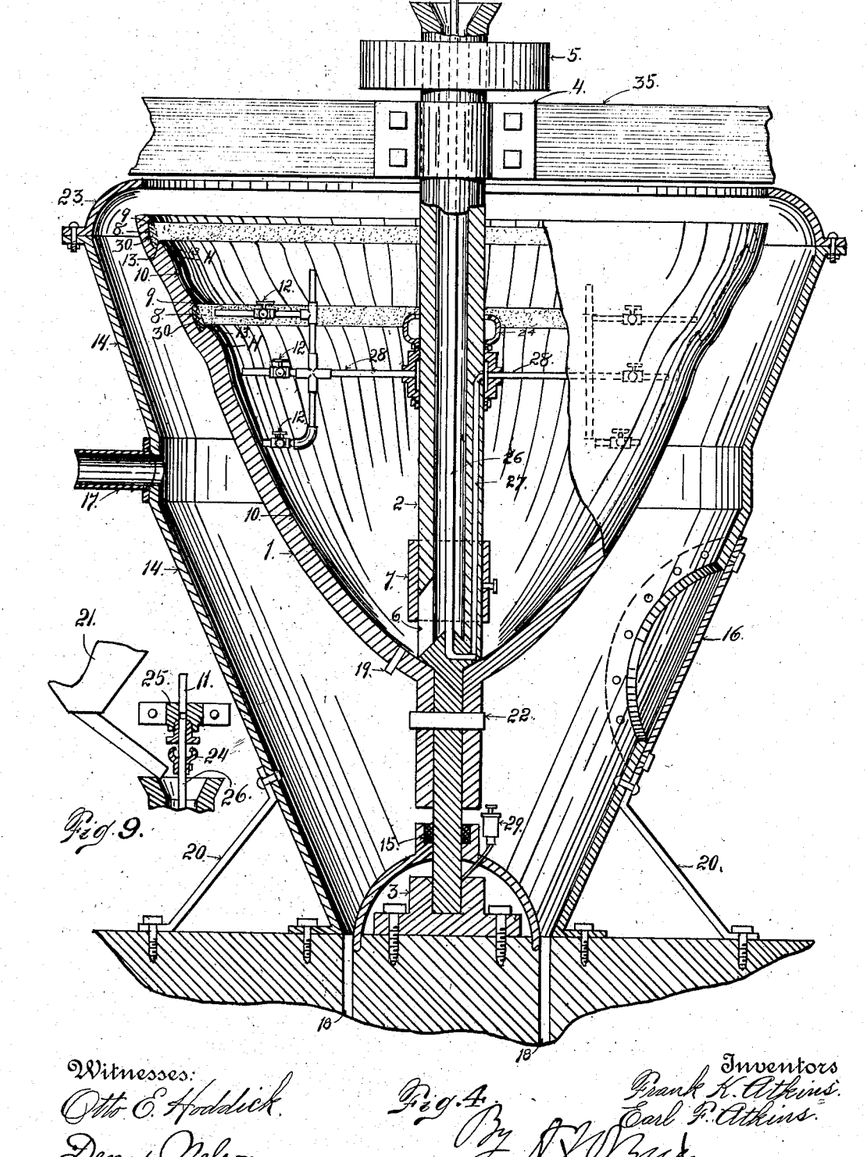
Fig. 4 is an elevation of the amalgamator, partly in section, showing a casing and several other modifications.
Fig. 9 is a view partly in section showing the upper extremity of the construction shown in Fig. 5.

In Figs. 4 and 5 that part of the shaft above the bottom of the bowl is made hollow and used as a feeder, the ore being discharged into the bowl through slots 6.

7 in Figs. 4 and 5 is a sleeve around the shaft secured to it by a set screw, used to regulate the discharge.

Figure 3:
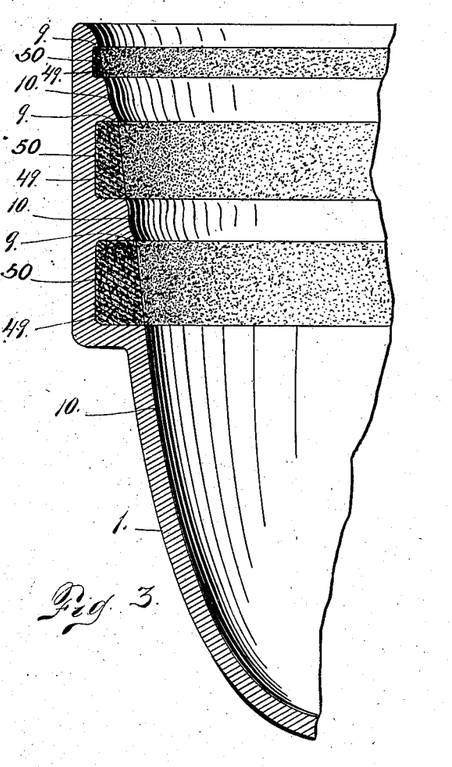
Fig. 3 is a similar view showing still another modification.

In the sides of the bowl are circumferential grooves and riffles; 10 represents the variably curved sheeting surfaces. In Figs. 1, 2, 5 and 7 or where the construction is used as an amalgamator, the grooves are designated 8, while in Figs. 3 and 6 where the construction is used as a centrifugal separator, the grooves are designated 50. The riffles are designated 9 in all the forms of construction.

Numerals 11, 12, 25, 26, 27 and 28 represent devices for supplying the compressed air or water to the interior walls of the bowl.

11 is a stationary pipe through which the air is admitted, connecting with box 25.

26 is a hollow tube within the hollow shaft, screwed into the cone of the shaft in such a manner as to revolve with the bowl, having an air tight connection at the top of said tube with box 25.

27 represents a hollow space in the shaft from the lower end of the tube horizontally, thence vertically, conducting the air or water as the case may be to pipes 28, said pipes being secured to the shaft revolving therewith.

12 are valves to control the jets.

When used wet the jets of water produce their riffles rising upwardly over the sheeting surfaces, similar to the riffles of water over the amalgam plates by gravity as flushed out by the splash from the stamps.

13 represents a lip to cause the sand to fall upon the surface of the mercury in the groove, it being found in practice that when the sand is permitted to strike the mercury upon the edge it causes the mercury to become fouled or muddied which retards amalgamation, but when the lip is used no such unfavorable results are present.

14 represents the casing or housing which receives the waste material when used as an amalgamator and the liquids when as a separator. This may be made in halves, secured together by flanges, bolts and nuts and the flanged joints packed to prevent the dust from escaping when handling dry ores or the water, when used wet. Or it may be made of sections riveted together.

15 is a box in the casing, packed with sheep skin having the wool thereon, the wool being placed in contact with the shaft to prevent the dust from passing to the step-box.

16 is a hand-plate or man hole plate, which when removed, allows access to the interior of the casing for removing the amalgam, etc.

17 is a pipe connected with the casing to which a suction fan may be attached and through which the dust may be drawn off when handling dry ores; 18 the discharge orifices for carrying off the waste material or the liquids as the case may be from the casing; 19 a plug or device which when removed permits the drawing off of the amalgam from the bowl when at rest; 20 stay rods to support the casing; 21 hopper containing the auriferous sand or ores screened and ready for treatment; 22 pins or lugs securing the bowl to the shaft.

23 is a deflector which may be made in one piece, having a flange at the bottom by which it may be secured by bolts and nuts to a similar flange in the casing.

24 is a tight fitting sleeve, secured to the shaft having a cup-like device at the top to collect the oil escaping from box 4, thereby preventing it from flowing down the shaft and fouling the mercury. A similar sleeve and device may be attached to tube 26 below box 25.

29 is an oil cup and device for lubricating step box 3.

30 represents the mercury in the groove.

In Fig. 5 the shaft rests upon ball bearing boxes 33; and the lower portion of the shaft is made hollow so as to permit the discharge of the gangue or solids through it in cleaning up a charge. In all cases when used for clarifying water or removing solids from solutions the grooves or receptacles should be given ample capacity. When the grooves are filled with solids represented by numeral 49, the speed is cut down by means of a friction clutch or brake 34 applied to the shaft by means of a lever. To stationary beam 35 above the bowl there is attached a scraper or blade 36; this may be raised or lowered by means of a ratchet 39, and moved horizontally by lever 44 attached to said beam. When the bowl shall have attained a sufficiently slow speed the blade is applied to the solid material, dislodging it from the groove, allowing it to fall to the bottom of the bowl. The grooves may be further cleaned by a brush or broom or water applied by means of a hose.

Numeral 37 represents a stopper of ball or conical shape having attached to it a vertical rod 45; this rod extends downwards through spider 47 and is surrounded by spiral spring 48 which holds the stopper firmly in place, preventing leakage and said valve is lifted from its socket in the shaft by means of lever 38; a lead gasket 51 should be used between this stopper and the shaft as a further preventive against leakage. When the stopper shall have been lifted water is applied to the ore in the bowl by means of a hose and nozzle and it is sluiced out thus clearing the machine and making ready for another charge.

Figures 6, 7, 8:
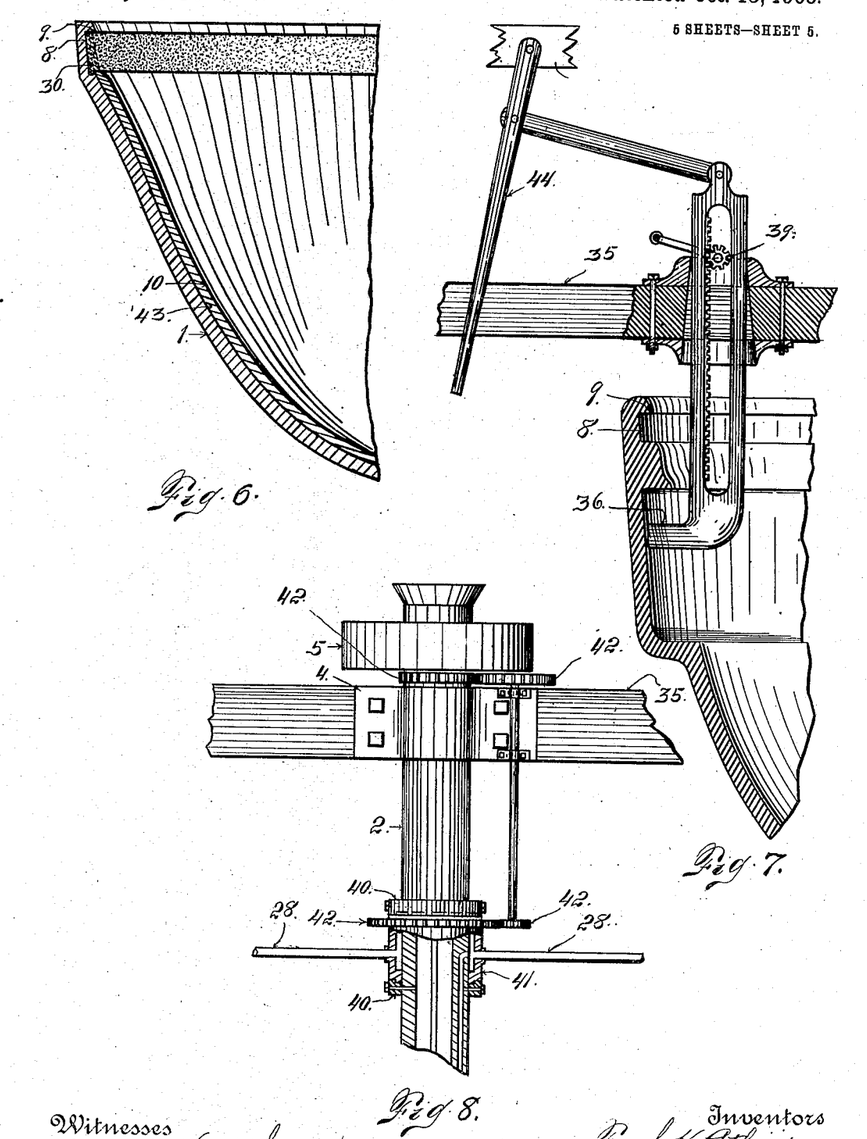
Fig. 6 is a section of a part of the bowl modified to show an inside shell of glass or other suitable material for use under certain conditions as hereinafter set forth.
Fig. 7 is an illustration of a blade or scraper attached to the beam and used to dislodge the solids from the grooves, the machine revolving at slow speed, in cleaning up a charge.
Fig. 8 is a modification of the devices for supplying the air or water jets whereby the pipes may be made to revolve at a greater or less speed than the bowl, being operated by gearing and pinions as shown.

Referring to Fig. 8 the upper and lower sections 40 are attached to the shaft.

Numeral 41 represents that portion of the box or device which has free play and may travel at a greater or less speed than the shaft; 42 the gearing by which the speed is regulated.

The receptacles may be one or more in number; the side walls of the bowl may be at any inclination, inclining, however, outwardly from the bottom to the top; the sheeting surfaces may be given any variable curve; the receptacles may be of any size and shape; the machine must be perfectly balanced and the boxes in perfect condition so as to permit it to revolve as smoothly as a spinning top. Any vibration will cause the mercury to be jarred from the grooves. The bowl and shaft may be made in one casting.

It is found in order to obtain the proper spreading of the sand in a thin layer, the sheeting surfaces must be smooth and wholly free from tool marks, horizontal or vertical. To obtain this result the inner surface of the bowl should be polished or enameled; the enameling may be but a thin coating over the metal surface or of glass or other suitable material of considerable thickness, or it may be an inside shell of glass, or any suitable composition, as shown by numeral 43 in Fig. 6. This shell when worn may be removed and replaced by another.

In cases where the chemicals in solution are such as to attack the metal, an enamel of glass or other material that will not be so affected should be used, or a glass bowl, substituted.

When a centrifugal machine is used as a separator of solids and liquids, or particularly as a clarifier of sedimentary solutions, receiving and discharging a continuous flow until the grooves are filled with solids as is herein contemplated, two obstacles are present that seriously militate against successful separation, and if not overcome result in a cloudy or foul solution discharged at the rim of the bowl, to wit: the air buoyancy due to particles of air in the cells of the solids, which tends to keep them in suspension under any agitation; and the agitation of the material due to the fact that the material fed in is at rest and comes in contact with the bowl walls, necessarily revolving at moderately high speed, and in further contact with other material to which the rotary motion has only been partially imparted. The centrifugal force almost instantly overcomes the air buoyancy when the material is free from agitation. In order to overcome the agitation, we employ in combination with a series of riffles, variably curved surfaces whose radii continuously expand from the bottom toward the top, the said surfaces being located below the riffles or below and between the grooves and in proximity thereto, whereby the movement of the sheet of material under treatment is first retarded and then accelerated in its upward travel just before reaching the riffles, whereby there is imparted thereto approximately the full rotary speed of the bowl before reaching the uppermost riffle, resulting in a clear liquid at the discharge point.

The term variably curved as used in the specification and claims, refers to the curvature below and in proximity to the riffles, whereby the sheet of material is first retarded and then accelerated just before reaching the riffles.

The operation as an amalgamator, is as follows: Mercury is fed into the machine, in sufficient quantity to fill the grooves, in advance of the ore and the machine rotated by means of the driving pulley. When the mercury shall have entered the grooves the ore is fed in from the hopper; it responds to the force and passes upwardly across the surfaces of the bowl and mercury discharging at the rim. When used as a separator of solids from liquids, we employ the sheeting surfaces together with centrifugal force for imparting the rotary movement of the bowl to the materials under treatment and also for delivering the solids to the central discharge outlet in the bottom of the bowl in cleaning up a charge. When used as an amalgamator the sheeting surfaces are employed for scouring the gold; for settling the free gold to the bottom of the sand before reaching the mercury zone; for imparting the rotary movement to the sand before it shall have come in contact with the mercury whereby the flouring of the mercury is overcome, and also for delivering the amalgam to the central bottom discharge outlet in cleaning up.

A centrifugal bowl or drum, when handling ores, tends to act as a concentrator and arranges the materials along the sides of the bowl according to their varying specific gravities. With a magnitude of force ranging anywhere from fifteen to fifty as compared to gravity, counting gravity as one, and a corresponding friction, the friction of sand on sand, under conditions where sand is permitted to travel over a bed of sand, becomes very great and causes the accumulation of a heavy bed over the bowl walls and mercury, increasing in depth as the depth of the bowl increases. When treating the dry auriferous sands, the magnetic iron lies underneath, the garnet next and the lighter sands above, the iron lying in a compact stationary bed over the side walls of the bowl and mercury, which bed revolves at practically the same speed as that of the inner walls of the bowl. This allows the other materials to skate upwards over the bed so as to seriously interfere with the amalgamation of the gold and mercury, and permits a large per cent. of the gold to be carried off with the sand. In handling ground ores, wet or dry, the sulfids take the place of the magnetic iron with similar results.

In order to obtain satisfactory separation and amalgamation it is imperative that the sand or ores be passed over the sheeting surfaces in a reasonably thin sheet, so that the gold may settle to the sheeting surface and come in direct contact with the mercury, and instead of a stationary layer over the quicksilver that the entire mass of ore may be impelled to move upwardly slowly over both the sheeting surfaces and the mercury. Unless the overlying bed is overcome the amalgamators as such are inoperative. It is true the bed of sulfids will catch and retain some gold in the operation but the advantages of the mercury cushion are lost. It is as though the side walls of the bowl were wholly of solid metal, the machine having degenerated from an amalgamator to a concentrator.

If a liquid be fed into a revolving bowl, having perpendicular walls, open at the top, the surface of the liquid will take its variable curve; the surface will approach or depart from the perpendicular as the magnitude of force is increased or diminished, always, however, maintaining its variable curve. If sand be fed in it will take its variable curve, differing from the former because of the increase in friction. We adjust the sheeting surfaces up to the point H on such variable curve which under the force employed making due allowance for the friction, will cause the sand to spread with an easy gentle flow and free from any packing effect in order that the gold may freely settle to the bottom of the sand even as gold settles by gravity on the amalgam plates so generally in use; after which it readily finds its way to the groove. From the point H, owing to the fact that the plane of the liquid is perpendicular to the force and the further fact that the liquid forms the base over which the sand must be passed, the sand can be impelled to move upwardly only by a crowding effect. This condition is met by the adjustments as shown in the drawings. If this crowding effect is allowed to extend from the riffle downwards all along the sides of the bowl, the high force produces such a packing of the sand as to prevent the gold from being released. It is impossible to obtain the desired result by the use of a straight walled bowl on the one hand, or a semi-spherical curved walled bowl (having a uniform radius) on the other. In case of the former if the inclination is adjusted so that the sand will be raised over that portion of the side walls near the bottom of the bowl where the force is comparatively low, it will be thrown violently when the force shall have been doubled, trebled or quadrupled higher up on the bowl, and a condition is developed whereby the sand is not held by the force against the sides of the bowl, in such manner as to impart to the ore the rotary movement, but a shooting effect is given it instead which permits the sand to charge into the mercury, resulting in the loss thereof, while the glancing and rebounding of the sand and gold results in the loss of the gold. In case of the latter the adjustments cannot be made to correspond to the constantly changing force and friction for the uniform diameter gives a curvature that causes the ore to travel too rapidly at the lower portion of the bowl followed by a packing effect and a stationary bed of sulfids farther up on the sides of the bowl, producing the unfavorable condition of sand passing over a bed of sulfids which as stated above, defeats the amalgamation.

Mercury, a highly sensitive liquid, and having no affinity for the sand will retain its place firmly under a constant force, and will permit sand to pass over it, without yielding, under a gentle upward movement, only when both the sand and mercury shall have acquired the same rotary speed. Instead of subjecting the mercury to two movements of the material, one movement being upwardly over its surface and the other movement being the movement incident to the fact that the mercury is running away from the material since it is traveling faster than the material, owing to the fact that the material has not yet acquired the speed of the bowl, we reduce it to one movement, namely, the upward travel of the material over the mercury surface, the material in the meantime having been given by its contact with the sheeting surface the same rotary velocity as the inner surfaces of the bowl and mercury have. Under these circumstances the material floats upwardly smoothly over the mercury surface resulting in no loss of the mercury. The variably curved sheeting surfaces, by virtue of which the radii of the curves of the surface of the bowl may be so regulated with reference to the increasing radii of the bowl itself from the bottom toward the top, that the material may be prevented from traveling upwardly too rapidly or too slowly, enables us to obtain a speed approximately both accurate and uniform, hence we are able to accomplish results not heretofore obtained, namely, that of passing gold bearing sand upwardly, wet or dry, over liquid mercury as gently under the influence of the combined forces of gravity and centrifugal force, as is obtained by passing a sheet of ore and water over amalgam plates by gravity.

As a further aid in making the separation and in overcoming the bed of sulfids we use air blast jets, applied to the sand along the sheeting surfaces, when treating dry ores and water jets, under pressure, when handling ores in solution. We also use an air blast jet or a stream of water under pressure applied by means of a hose and nozzle, after the ore feed shall have been cut off and while the bowl is still rotating, to clear the bowl of all dirt or dust, sand and sulfids in making clean-ups, then the bowl is stopped, the amalgam drawn off, the mercury distilled and the gold is ready for the mint.

The overlying bed dispensed with and the loss of the mercury overcome, we are enabled to obtain the incalculable advantages to be derived from the intensity of the force, among which are the submerging of the float gold, collecting the gold after scouring in a groove and the sinking of the coated gold into the mercury leaving the clear mercury still exposed at the surface permitting the most ideal amalgamation.

Having thus described our invention, what we claim is:

1. A centrifugal separator of the class described, comprising a rotary bowl whose diameter increases from the bottom toward the top, provided with a number of interior circumferential grooves adapted to hold a quantity of mercury and expose the mercury surface to the material under treatment, the said mercury surface forming a continuation of the inner surface of the bowl, the lowermost groove being located a sufficient distance above the bottom of the bowl to allow the material under treatment to acquire the rotary speed or velocity of the bowl before it comes in contact with the mercury of the lowermost groove, the inner surface of the bowl consisting of a number of variably curved retarding surfaces alternating with the circumferential grooves.

2. In a centrifugal separator, the combination of a rotary bowl open at the top and having a cone-shaped central part extending upwardly from the bottom thereof a suitable distance, the said bowl increasing in diameter from the bottom toward the top, a shaft passing through the center of the bowl and suitably journaled, the bowl being made fast to the shaft, a hollow feed tube being fast to the upper part of the shaft and open at the top and bottom, the inner surface of the bowl above the bottom being provided with circumferential grooves adapted to contain a quantity of mercury, and forming mercury zones over which the material under treatment passes under the influence of centrifugal force due to the speed of the bowl's rotary movement, the portion of the bowl below the lowermost groove being of sufficient depth to enable the material under treatment to acquire the rotary speed of the bowl before it reaches the lowermost mercury zone, and the inner surface of the bowl being provided with a number of variably curved retarding surfaces alternating with the circumferential grooves.

3. A centrifugal separator comprising a revoluble bowl whose radius increases from the bottom toward the top, the said bowl being provided with a series of circumferential grooves formed in its inner wall, said grooves being adapted to contain liquid mercury, the inner surface of the bowl being provided with a number of variably curved retarding surfaces alternating with the circumferential grooves.

4. A centrifugal separator comprising a revoluble bowl whose radius increases from the bottom toward the top, and provided on its inner surface with a plurality of circumferential grooves suitably separated, said grooves being adapted to contain liquid mercury, the wall of the bowl above the grooves having inward projections provided with rounded surfaces leading upwardly from the bowl proper, the inner wall of the bowl consisting of a number of variably curved retarding surfaces alternating with the circumferential grooves.

5. A centrifugal separator comprising a revoluble bowl whose radius increases from the bottom toward the top, the inner surface of the bowl being provided with circumferential grooves, and having a lip projecting upwardly beyond the bottom of each groove, whereby a quantity of mercury is held in the lower part of the groove when the machine is at rest, the wall of the bowl being provided with an opening through which the amalgam may be drawn off, and a suitable plug or stopper for closing the hole when the machine is in operation, the inner wall of the bowl being provided with a number of variably curved retarding surfaces alternating with the circumferential grooves.

6. A centrifugal separator comprising a revoluble bowl whose radius increases from the bottom toward the top, the said bowl being provided with interior circumferential grooves, said grooves being adapted to contain mercury when the machine is in motion, the bottom of the bowl being provided with an opening to draw off the liquid mercury which escapes from the grooves into the bottom of the bowl when the machine is at rest, and suitable means for closing said opening in the bottom of the bowl when the machine is in operation, the inner wall of the bowl being provided with a number of variably curved retarding surfaces alternating with the circumferential grooves.

7. A centrifugal separator comprising a revoluble bowl whose radius increases from the bottom toward the top, said bowl being provided with a circumferential groove formed in its inner wall, said groove being adapted to contain liquid mercury, the inner surface of the wall of the bowl below the groove and in proximity thereto, being provided with a number of variably curved retarding surfaces.

8. A centrifugal separator comprising a revoluble bowl whose radius increases from the bottom toward the top, said bowl being provided with a circumferential groove formed in its inner wall, the inner surface of the wall of the bowl being provided with a number of variably curved retarding surfaces.

9. A centrifugal separator comprising a revoluble bowl whose radius increases from the bottom toward the top, said bowl being provided with a plurality of circumferential grooves formed in its inner wall, the inner surface of the wall of the bowl being provided with a number of variably curved retarding surfaces.

10. A centrifugal separator comprising an open-topped rotatable bowl having a variably expanding radius from the bottom toward the top, said bowl being provided with a plurality of circumferential grooves formed in its inner wall, the said bowl having such variably curved retarding inner surfaces below and between the grooves, as will, by the application of the variable force and friction under the variably expanding radius, impel the materials under treatment to spread in a thin sheet thereon and move upwardly loosely with an easy gentle flow for the purpose set forth.

11. A centrifugal separator comprising a rotatable bowl whose radius increases from the bottom toward the top, said bowl being provided with a plurality of circumferential grooves formed in its inner wall, means for discharging fluid jets against the inner surface of the wall of the bowl, comprising a shaft rotating with the bowl, a box mounted on the shaft to rotate independently thereof, laterally disposed conduits leading from said box, and means for rotating the fluid-jet-discharge mechanism at a different rate of speed from the travel of the bowl, including a gear connection between the shaft and the box.

12. A centrifugal separator comprising an open topped revoluble bowl having a variably expanding radius from the bottom toward the top, said bowl being provided with a circumferential groove formed in its inner wall, said groove being adapted to contain liquid mercury, the inner wall below the groove having such a variably curved surface as will, by the application of the variable force and friction under the variably expanding radius, impel the materials under treatment to spread in a thin sheet on the inner surface of the bowl and move upwardly loosely with an easy flow for the purpose set forth, said bowl being of sufficient depth below the groove to impart the rotary movement of the bowl to the materials under treatment before reaching said groove, said inner wall below the said groove and in suitable proximity thereto, being provided with variably curved retarding surfaces.

13. A centrifugal separator, comprising a rotatable bowl whose radius increases from the bottom toward the top, said bowl being provided with a circumferential groove formed in its inner wall, the inner surface of the wall of the bowl being variably curved, a centrally located shaft to which the bowl is made fast, means applied to the shaft for rotating the bowl, fluid jet delivery mechanism mounted on the said shaft and arranged to discharge upon the inner wall of the bowl, and a gearing connection between the shaft operating means and the said mechanism, whereby the latter rotates at a different speed from the shaft and bowl, substantially as described.

14. A centrifugal separator comprising an open topped revoluble bowl having a variably expanding radius from the bottom toward the top, said bowl being provided with a circumferential groove formed in its inner wall, the inner wall below said groove having such a variably curved surface as will, by the application of the variable force and friction under the variably expanding radius, impel the materials under treatment to spread in a thin sheet upon the inner wall of the bowl and move upwardly thereon loosely with an easy flow for the purpose stated, said bowl being of sufficient depth below the groove to impart the rotary movement of the bowl to the materials under treatment before reaching said groove, and said inner wall below said groove and in suitable proximity thereto being provided with variably curved retarding surfaces.

15. A centrifugal separator comprising a revoluble bowl whose radius increases from the bottom toward the top, said bowl being provided with a circumferential groove formed in its inner wall, the inner surface of the wall of the bowl being variably curved for retarding purposes, and means for discharging fluid jets against the inner wall of the bowl for the purpose set forth.

16. A centrifugal separator, comprising a rotatable bowl whose radius increases from the bottom toward the top, said bowl being provided with a circumferential groove formed in its inner wall, the inner surface of the wall of the bowl being variably curved for retarding purposes, a centrally located shaft rotating with the bowl, and means suitably mounted on the shaft for discharging fluid jets against the inner wall of the bowl, substantially as described.

17. A centrifugal separator, comprising a rotatable bowl whose radius increases from the bottom toward the top, said bowl being provided with a circumferential groove formed in its inner wall, the inner surface of the wall of the bowl being variably curved for retarding purposes, and fluid jet delivery mechanism mounted to rotate with the bowl and arranged to discharge upon the inner wall thereof.

18. A centrifugal separator, comprising a rotatable bowl whose radius increases from the bottom toward the top, the said bowl being provided with a circumferential groove formed in its inner wall, the inner surface of the wall of the bowl being variably curved for retarding purposes, and fluid jet delivery mechanism mounted to rotate and arranged to discharge upon the inner wall thereof.

19. A centrifugal separator, comprising a revoluble bowl whose radius increases from the bottom toward the top, said bowl being provided with circumferential grooves formed in its inner wall, the inner surface of the wall of the bowl being provided with variably curved retarding surfaces, fluid jet delivery mechanism mounted to rotate and arranged to discharge upon the inner surface of the bowl, and a casing surrounding the bowl, the latter being open at the top to discharge into the casing, and the casing being provided with an exhaust outlet, substantially as described.

20. A centrifugal separator, comprising a revoluble bowl having an enameled surface, the radius of the bowl increasing from the bottom toward the top, said bowl being provided with a circumferential groove formed in its inner wall, said groove being adapted to contain mercury, the inner surface of the wall of the bowl below the groove and in proximity thereto being variably curved for the purpose set forth.

21. A centrifugal separator, comprising a revoluble bowl having an enameled inner surface and whose radius increases from the bottom toward the top, said bowl being provided with a circumferential groove formed in its inner wall, the inner surface of the wall of the bowl being variably curved for the purpose set forth.

22. A centrifugal separator, comprising a revoluble bowl having an enameled surface and whose radius increases from the bottom toward the top, said bowl being provided with a plurality of circumferential grooves formed in its inner wall, the inner surface of the wall of the bowl being variably curved for the purpose set forth.

23. A centrifugal separator, comprising a rotatable bowl having an enameled surface and whose radius increases from the bottom toward the top, said bowl being provided with a plurality of circumferential grooves formed in its inner wall, the inner surface of the wall of the bowl being variably curved for retarding purposes, and means for discharging fluid jets against the inner surface of the wall of the bowl.

24. A centrifugal separator, comprising a rotatable bowl whose radius increases from the bottom toward the top, said bowl being provided with a plurality of circumferential grooves formed in its inner wall, the inner surface of the wall of the bowl being provided with a number of variably curved retarding surfaces, a central shaft connected to rotate with the bowl, an air box mounted on the shaft, a conduit passing through the shaft for delivering air to said box, laterally projecting pipes leading from the box for delivering air blast jets against the inner wall of the bowl.

25. A centrifugal separator, comprising a rotatable bowl whose radius increases from the bottom toward the top, the said bowl being provided with a circumferential groove formed in its inner wall, said groove being adapted to contain mercury, the inner surface of the wall of the bowl, below the groove and in suitable proximity thereto being curved to variably retard the upward passage of the material, said bowl having an outlet at the bottom through which the amalgam may be discharged or removed while cleaning up.

26. A centrifugal separator, comprising a rotatable bowl whose radius increases from the bottom toward the top, said bowl being provided with a circumferential groove formed in its inner wall, the inner surface of the wall of the bowl being variably curved for retarding purposes, a hollow open-ended shaft passing through the bottom of the bowl and rotating with the latter, the said shaft having an opening at the lower interior part of the bowl through which the material may be fed to the latter for treatment and also through which the amalgam may be passed to the discharge opening through the shaft while cleaning up.

27. A centrifugal separator, comprising a revoluble bowl whose radius increases from the bottom toward the top, the said bowl being provided with a plurality of circumferential grooves formed in its inner wall, the inner surface of the wall of the bowl being variably curved for retarding purposes, the bowl being provided at the bottom with a valve-controlled discharge opening, substantially as described.

28. A centrifugal separator, comprising a revoluble bowl whose radius increases from the bottom toward the top, said bowl being provided with a plurality of circumferential grooves formed in its inner wall, the inner surface of the wall of the bowl being variably curve for retarding purposes, a hollow open-ended shaft passing through the bowl and rotating therewith, the said shaft having an opening at the bottom of the bowl through which the material fed downwardly through the shaft may pass to the bowl, and also through which the material may be discharged from the bowl while cleaning up, and a valve for controlling the passage of the material from the bowl to the hollow shaft.

29. A centrifugal separator comprising a revoluble bowl whose radius increases from the bottom toward the top, said bowl being provided with a circumferential groove formed in its inner wall, the inner surface of the wall of the bowl being variably curved below the groove to retard the upward passage of the material, and a vertically reciprocating scraper projecting into the bowl for removing the accumulated material from the said groove, substantially as described.

In testimony whereof we affix our signatures in presence of two witnesses.

FRANK K. ATKINS.
EARL F. ATKINS.

Witnesses for Frank K. Atkins:
 DENA NELSON,
 A. J. O'BRIEN.

Witnesses for Earl F. Atkins:
 J. A. DAVISON,
 HERBERT REEVES.